(12) United States Patent
Lindwer et al.

(10) Patent No.: US 8,146,063 B2
(45) Date of Patent: Mar. 27, 2012

(54) TRANSLATION OF A SERIES OF COMPUTER INSTRUCTIONS

(75) Inventors: Menno Menasshe Lindwer, Eindhoven (NL); Geraud Plagne, Nanterre (FR); Evert-Jan Daniël Pol, Eindhoven (NL); Hugues Dailliez, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1984 days.

(21) Appl. No.: 10/545,646

(22) PCT Filed: Feb. 5, 2004

(86) PCT No.: PCT/IB2004/050078
§ 371 (c)(1), (2), (4) Date: Aug. 16, 2005

(87) PCT Pub. No.: WO2004/073376
PCT Pub. Date: Sep. 2, 2004

(65) Prior Publication Data
US 2006/0179423 A1      Aug. 10, 2006

(30) Foreign Application Priority Data
Feb. 20, 2003   (EP) .................................... 03290421

(51) Int. Cl.
*G06F 9/44* (2006.01)
*G06F 9/45* (2006.01)
(52) U.S. Cl. ......... 717/139; 717/137; 717/153; 717/159
(58) Field of Classification Search .................. 717/148, 717/149, 159, 155
See application file for complete search history.

(56) References Cited

U.S. PATENT DOCUMENTS

| | | | |
|---|---|---|---|
| 4,638,427 A | 1/1987 | Martin | |
| 5,418,953 A | 5/1995 | Hunt et al. | |
| 5,452,461 A * | 9/1995 | Umekita et al. | 717/149 |
| 5,875,336 A * | 2/1999 | Dickol et al. | 717/143 |
| 6,507,947 B1 * | 1/2003 | Schreiber et al. | 717/160 |
| 6,615,340 B1 * | 9/2003 | Wilmot, II | 712/209 |
| 6,691,306 B1 * | 2/2004 | Cohen et al. | 717/139 |

(Continued)

FOREIGN PATENT DOCUMENTS
WO      WO9819238 A1      5/1998

OTHER PUBLICATIONS

Lin et al., Compressing MIPS code by multiple operand dependencies, Nov. 2003, pp. 483-508, <http://delivery.acm.org/10.1145/960000/950164/p482-lin.pdf>.*

(Continued)

*Primary Examiner* — Thuy Dao

(57) ABSTRACT

A series (20) of original instructions for a single processor is translated into implementing instructions for executions distributed over a plurality of processors (12,16) of different type. The series (20) of original instructions is split into successive sections (22a-c,24a,b) assigned to respective ones of the processors (12,16). Operand transfer instructions are added to the sections (22a-c,24a,b) to support data dependencies between the sections (22a-c,24a,b). The assignment includes selecting a location of a boundary in the series of original instructions between successive ones of the sections (22a-c,24a,b) so as to substantially minimize an aggregate of the execution cost factors of the original instructions as implemented and including costs for the operand transfer instructions. Preferably, the locations of the boundaries are determined from a search among different boundaries positions.

20 Claims, 2 Drawing Sheets

U.S. PATENT DOCUMENTS

Figure 1:
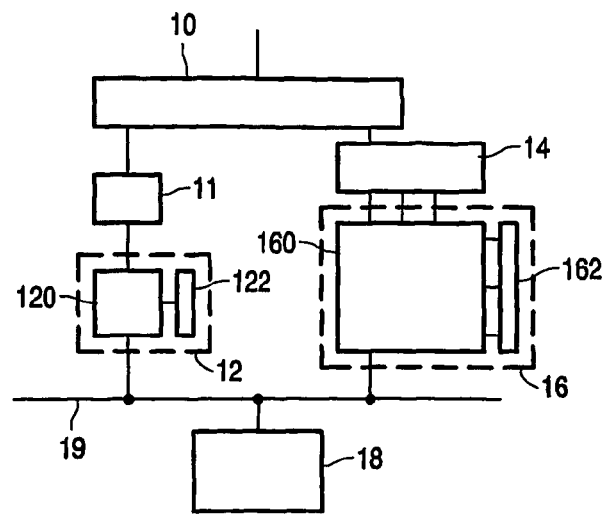

| | | | |
|---|---|---|---|
| 6,910,207 B2* | 6/2005 | Steinbusch | 717/153 |
| 7,080,362 B2* | 7/2006 | Patel et al. | 717/139 |
| 7,089,539 B2* | 8/2006 | Dornan et al. | 717/139 |
| 7,134,119 B2* | 11/2006 | Nevill | 717/139 |
| 7,181,732 B2* | 2/2007 | Bak et al. | 717/140 |
| 7,418,580 B1* | 8/2008 | Campbell et al. | 712/227 |
| 7,536,682 B2* | 5/2009 | Dankel et al. | 717/139 |
| 2002/0092002 A1* | 7/2002 | Babaian et al. | 717/137 |
| 2002/0101930 A1* | 8/2002 | Wang et al. | 375/240.23 |
| 2003/0120897 A1* | 6/2003 | Schlansker | 712/200 |
| 2004/0015911 A1* | 1/2004 | Hinsley et al. | 717/147 |
| 2004/0111715 A1* | 6/2004 | Stone | 717/148 |
| 2006/0150171 A1* | 7/2006 | Sapir et al. | 717/159 |

OTHER PUBLICATIONS

Goshima et al., A high-speed dynamic instruction scheduling scheme for superscalar processors, Dec. 2001, pp. 225-236, <http://delivery.acm.org/10.1145/570000/564028/p225-goshima.pdf>.*

Nagpal et al., Integrated temporal and spatial scheduling for extended operand clustered VLIW processors, Apr. 2004, pp. 457-470, <http://delivery.acm.org/10.1145/980000/977155/p457-nagpal.pdf>.*

Ashok Halambi, et al: An Efficient Compiler Technique for Code Size Reduction Using Reduced Bit-width ISAs: Mar. 2002, pp. 402-408.

A. Krishnaswamy et al: Profile Guided Selection of ARM and Thumb Instructions, vol. 37, Jul. 2002, pp. 56-64.

* cited by examiner

TRANSLATION OF A SERIES OF COMPUTER INSTRUCTIONS

Computer programs are usually distributed in the form of a file with a series of (virtual) machine instructions. A JAVA program, for example, is distributed as a series of byte codes. Conventionally the (virtual) machine instructions are executed successively by a single processor that "understands" the instructions, but it is also known to translate machine instructions of a program for one processor to instructions for a target processor and to execute the translated instructions with the target processor. A JAVA byte code program, for example, may be translated into native instructions for direct execution by a processor. Without translation the processor would have to run an interpreter program to execute the JAVA byte codes. JAVA Hot Spot is a technique for selectively translating parts of a JAVA program into native instructions. JAVA Hot Spot detects the frequency with which different parts of the program are interpreted and translates the most frequently executed parts into native instructions for later direct execution. Thus, the processor that executes the JAVA program is able to execute the most frequently executed program parts directly, and less frequently executed instructions indirectly by executing the interpreter program.

In another development it has been known to provide heterogeneous processing systems, which include different processors that incur different instruction dependent costs for executing instructions. U.S. Pat. No. 4,638,427, for example, teaches use of a major and a minor processor. A task program is supplied with instructions for the major processor. The minor processor is capable of executing the instructions from the task program, be it that some or all of the instructions require emulation. U.S. Pat. No. 4,638,427 teaches computing an affinity value for the task program, expressed in terms of the number of additional instructions needed to execute the task program with the minor processor. The affinity values of tasks are used to select whether tasks will be run on the major or the minor processor. PCT patent application WO 98/19238 also discloses a heterogeneous processing system. Here the different processors have generally different instruction sets. Various threads of a program are compiled for different ones of the processors, so that the threads will be executed by respective ones of the processors.

None of these publications discusses the possibility of translating a program of (virtual) machine instructions into instructions for native execution by a heterogeneous processor. However, JAVA generally supports multiple threads. Conceivably, instructions for the different threads (tasks) might be translated into native instructions for different processors, possibly using affinity values to select the assignment of tasks to different processors. This does not yet make optimal use of a heterogeneous processing system.

Among others, it is an object of the invention to provide for a method of translating a series of instructions from a program for a single processor into implementing instructions for efficient execution in a system that contains a plurality of heterogeneous processors.

The method according to the invention is set forth in claim 1. Respective sections of the program are translated into instructions for respective ones of the processors and the locations of transitions between the sections are selected dependent on a minimization of an aggregate cost of executing the instructions distributed over the different processors.

The method is applied for example to programs of JAVA byte codes. Thus, a program that can be executed on any computer is adapted to run optimally on a specific computer with mutually different processors.

The selection of the combination of boundary locations that minimizes aggregate costs may be performed in any way, once the cost factors have been defined. In a first embodiment an execution cost factor is used that increases with a count of implementing instructions needed to implement the original instruction in a particular processor. Thus the boundaries between sections are located so as to minimize the amount of instruction execution needed to implement the original instructions. In a second embodiment an execution cost factor is used that increases with an amount of energy consumed by a particular processor. Thus the boundaries between sections are located so as to minimize the amount power consumption for executing the implementing instructions.

Preferably, the locations of the boundaries between sections that are implemented on different processors are determined in a search, evaluating and comparing aggregate cost factors including costs for operand transfer instructions for implementing groups of instructions for alternative ones of the processors. Preferably, the search is performed by cumulatively constructing alternative paths with different boundaries, and eliminating inferior paths once it is clear that these inferior paths cannot improve on better paths, under any possible further cumulative extension of the inferior paths. In an embodiment original instructions are assigned per basic block (from a branch target in the original instructions to a next branch target). It has been found that in practical programs this simplifies the search without seriously affecting optimality of the boundaries. Thus, use is made of program structure to select a most cost effective way to implement the original instruction on the different processors.

In an embodiment one of the processors is a VLIW (Very Large Instruction Word) processor, capable of implementing a plurality of original instructions per implementing instruction. In this case, costs may be reduced by combining original instructions into a single VLIW instruction.

These and other advantageous aspects of the invention will be described in more detail using the following figures.

FIG. 1. shows a heterogeneous processing system

Figure 2:
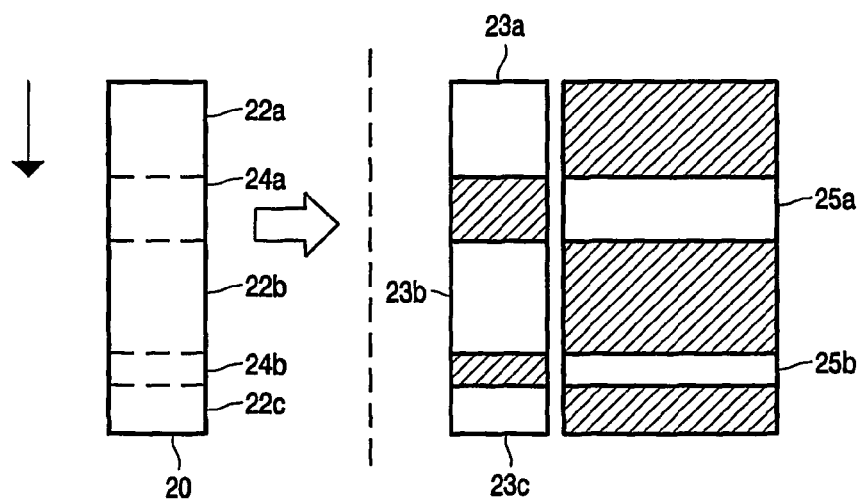

FIG. 2. shows a series of instructions and translated instructions

Figure 3:
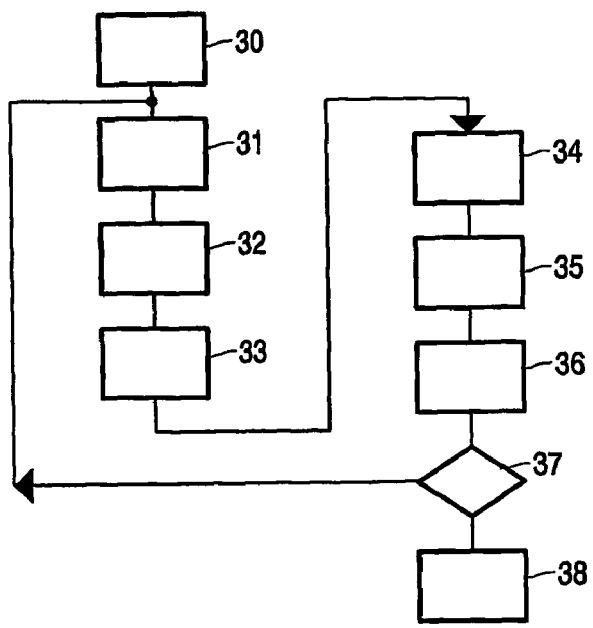

FIG. 3. shows a flow-chart for translating a program

Figure 4:
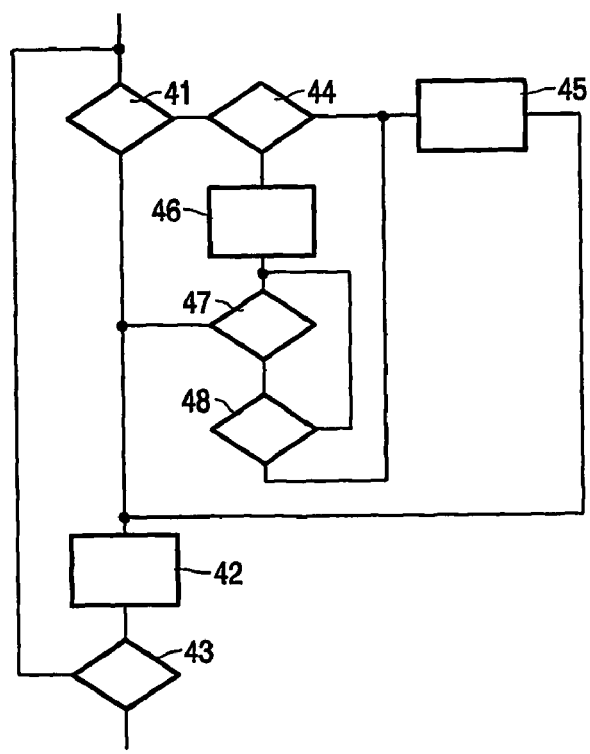

FIG. 4. shows a further flow-chart for translating a program

The invention will be described in terms of a system that receives JAVA programs from the Internet and translates the byte codes from a JAVA program into native instructions, so that execution of translated instructions proceeds alternatingly on two different processors. However, it should be understood that the invention is not limited to JAVA programs. For example, the invention may be applied as well to programs of X86 instructions. Similarly, a greater number than two processors may be used.

FIG. 1 shows an example of a heterogeneous processing system. The system contains instruction memories 11, 14, a first processor 12, a second processor 16, a data memory 18 and bus 19. For the sake of clarity, a separate instruction translation unit 10 is shown, with outputs coupled to instruction memories 11, 14, but it should be understood that in practice one of processors 12, 16 may serve as translation unit, the instruction memories being coupled to bus 19; instruction memories 11, 14 may be part of data memory 18 or be part of a merged instruction memory for both processors 12, 16. Instruction memories 11, 14 are coupled to processors 12, 16. Processors 12, 16 and memory 18 are coupled via bus 19.

First processor 12 is shown to contain a processing unit 120 and a register file 122. Similarly, second processor 16 contains a processing unit 160 and a register file 162. By way of example, second processor is a VLIW processor, register file 162 being multiported for supplying multiple operands and receiving multiple results in parallel from a plurality of functional units (not shown separately) in processing unit 160, the instruction memory of second processor 16 outputting commands for different functional units in parallel. In contrast first processor 12 is shown to contain circuitry for processing a single command at a time.

In operation, instruction translation unit 10 receives a program on an external connection (for example via the Internet). The program includes a series of instructions for a single processor, for example a series of byte codes all for execution by a JAVA (virtual) machine. Instruction translation unit 10 translates the series of instructions into instructions for first and second processor 11, 16. Often it may be possible to translate a byte code into a single instruction for first or second processor 12, 16, or, when one of the processors is a VLIW processor, a plurality of byte codes may even be translated into a single instruction for that one of the processors 12, 16. However, in some cases it may be necessary to use a series of a plurality of instructions as a translation of a byte code.

FIG. 2 symbolically shows a series of original instructions 20 from the original program and sections 22a-c which are translated into blocks of instructions 23a-c for first processor 12 and sections 24a,b which are translated into blocks of instructions 25a,b of translated instructions for second processor 16. The series of original instructions 20 progresses from top to bottom. A first part of series 20 is translated into a first section 22a of instructions for first processor 12. A second part of series 20 is translated into a second section 24a of instructions for second processor 16. A third part of series 20 is translated into a third section 22b of instructions for first processor 12 and so on.

In the shaded areas outside the blocks 23a-c, 25a,b where instructions for a processor 12, 16 are generated, the "other" processor 12, 16 executes no relevant instructions. The instruction memory 11, 14 for the relevant processor 12, 16 may contain NOPs (No Operation Instructions) for those sections. Alternatively, some instruction for switching the relevant processor to a low power consumption mode may be used during a section.

After translation the program is executed by the combination of the two processors 12, 16, the second processor 16 taking over from the first processor 12 and vice versa at the boundaries between the sections 22a-c, 24a,b. The processors 12, 16 read the translated instructions from instruction memories 11, 14, execute the translated instruction, which involves reading operands from register files 122, 162 and writing results to register files 122, 162 and, for some instructions, reading or writing data in memory 18.

Apart from translations of the instructions from the original series 20, the blocks that implement sections 22a-c, 24a,b may contain additional transfer instructions for transferring operand data between the register files of the processors 12, 16. Instruction translation unit 10 generates such additional transfer instructions as appropriate in case of data dependencies between the sections. That is, when an instruction from a section 22a-c, 24a,b that is executed by a first one of processors 12, 16 uses an operand that is the result of an instruction from another section that is executed by a second, different one of processors 12, 18, instruction translation unit 10 adds one or more transfer instructions to transfer the result from the second one of the processors to the first one of the processors. When one or more of processors 12, 16 are pipelined, it may additionally be necessary to insert NOPs between the blocks that implement sections, so that no processor executes any instructions until data that is needed in the next section has become available.

Instruction translation unit 10 has to choose the locations of transitions between sections 22a-c, 24a,b for different processors. That is, it has to choose where to subdivide the original series of instructions, which were all instructions for a single processor, into sections for implementing the instructions on different processors 12, 16. Instruction translation unit 10 performs the selection of these locations so as to minimize a cost function. A number of alternative embodiments exist for the cost function.

In a first embodiment an instruction cycle count that counts the total number of instruction cycles needed for implementing the series of instructions is used, i.e. the number of cycles needed for translated instructions plus additional transfer instructions. (In processors that execute one instruction per cycle this number equals the number of instructions). Without counting transfer instructions, it would of course result that for each instruction the processor 12, 16 where the instruction can be implement with the minimum number of cycles would be used, but due to the need for transfer instructions a certain threshold exists against switching. The first embodiment assumes that the instruction cycles of processors 12, 16 have the same length. More generally, the time duration needed for executing the implementation of the series of instructions is used.

In a second embodiment cycles executed by different processors are weighed differently in the cost function, assigning for example a heavier weight to instructions executed by VLIW processor to account for opportunity costs. Thus, the most lightly weighted one of the processors will be a "favored" processor for implementation. The heavier weighted one of the processors will generally only be selected for those instructions for which it is able to speed up processing sufficiently to counteract the heavier weight and any necessary additional transfer instructions. This may occur for example for instructions that can be implemented on the less heavily weighted processor only by means of a plurality of instructions.

In yet further embodiments, power consumption may be weighed in the cost function. If one of processors 12, 16 (e.g. a VLIW processor) consumes more power per instruction execution than the other processor a correspondingly heavier weight is assigned to instructions executed by that processor in the cost function. This weight may express the difference between power needed for executing a NOP (No Operation) instruction and another instruction, or in the case that the processor can be switched to a low power mode when it does not execute an instruction, the difference between power consumed during execution of the instruction and in the low power mode respectively. Thus, the heavier weighted one of the processors will only be selected if it is able to speed up processing sufficiently to counteract the greater power consumption.

Various techniques may be used for selecting the locations of boundaries between the sections. In a first embodiment a search technique is used, which considers a plurality of different subdivisions of the series of original instructions 20 into sections 22a-c, 24a,b, evaluates the aggregate costs for each of the plurality of subdivisions and selects the subdivision with the least costs. Many ways of implementing such a search exists.

One type of embodiment will be described in more detail. This embodiment considers "paths". A path P describes for each instruction from the series of original instructions 20 on which of processors 12, 16 the instruction is implemented. An example of a representation of a path is $$P=(1,1,2,2,1,1)$$

This denotes that a sequentially first, second, fifth and sixth original instruction from series 20 are implemented in a first processor 12 and that a third and fourth instruction are implemented in a second processor 16.

Paths P are constructed cumulatively: first a partial path P(i) is constructed for instructions from series 20 up to and including the $i^{th}$ instruction of series 20 (the path describing the processors where the instructions up to and including that instruction are implemented). From a partial path P(i) extended paths P(i+1)=(P(i)|x) may be constructed (the symbol "|" denoting appending of x at the end of the preceding path), each by assigning a different one "x" of the processors 12, 16 to implement the instruction.

For each path P(i) an aggregate cost A(P(i)) may be computed, which is the sum of the costs of implementing the instructions up to and including the $i^{th}$ instruction on the processors selected in the path, plus the cost of transfer instructions for the operands. The aggregate cost A of a path P(i+1) may be expressed recursively in terms of the costs of the path P(i) from which this path has been constructed:

$$A((P(i)|x))=A(P(i))+C(i+1,x)+T$$

Here C(i+1,x) is the cost of implementing instruction (i+1) of the series 20 on processor "x" and "T" is the cost of transfer instructions for transferring operands to processor x, as far as needed for instruction (i+1) of the series.

In principle the number of different paths that needs to be considered increases exponentially with the number of instructions in series 20: when there are N processors to chose from (N=2 in the embodiment of FIG. 1) there are $N^i$ paths P(i). However, many of these paths may be pruned heuristically on the basis of the following considerations. If one compares a first and second path P(i) and P'(i) one can say that the first path will always be better than the second path if the difference between the aggregate costs of the paths is greater than the transfer cost $T_{all}$ for transfer instructions to ensure that after the first path all operands that are still needed after the $i^{th}$ instruction are at least available on the same processors as after the second path:

$$A(P(i))-A(P'(i))<T_{all}$$

In this case one need not consider any further path derived from the second path P'(i), since it can never cost less than the best path derived from the first path P(i). Thus, the number of paths that need to be considered can be considerably reduced.

For example, if a first path P=(1,1,2,2,2,2) may have a cost of A=5 (1 for each instruction indicated by 1 and executed on first processor 12, 0.5 for each instruction indicated by 2 and executed on second processor 16 plus 1 for transfer of an operand from first processor 12 to second processor 16). A second path P'=(1,1,1,1,1,1) may have a cost of A=6 (1 for each instruction). Now if only one result that is located on second processor 16 only after path P is needed as an operand later on and the cost of transferring this operand is 1 or less, then second path P' can never lead to lower cost than first path P. Therefore, second path P may be eliminated from consideration.

In principle, this type of pruning requires the comparison of each pair of paths under consideration. But a less stringent pruning can be realized with much less work by computing for each path an upper bound U(P(i)) for the minimal transfer cost needed to proceed from the path P(i) using any combination of processors 12, 16. From the upper bound of all paths P(i) under consideration minimum sum MIN is determined from the sums A(P(i))+U(P(i)). Now a path P(i) may be rejected when $$A(P(i))>MIN$$

Determination of the upper bound involves determining the number of "live" operands that have been produced up to the $i^{th}$ instruction that are still needed after that instruction. Various alternative implementations are possible, which may be more or less efficient, dependent on the nature of the cost function. When the cost function generally favors a particular processor for most types of instructions, an upper bound U' may be computed by summing the transfer costs for transferring all live operands that are not yet available on the favored processor to that favored processor. As before a minimum MIN' of A+U' may be determined among all paths. Next, a headstart cost H(P(i)) may be computed for each path, by determining which live operands are available on other processors than the favored processor and summing the costs for transfer instructions that would be needed to transfer those live operands to those processors from the favored processor. Now a path may be rejected when $$A(P(i))-H(P(i))>MIN'$$

One may even reject a path in case of equality to reduce the number of paths.

FIG. 3 shows a flow chart for selecting the boundaries between sections. The flow chart starts with an initial step 30 followed by a series of steps that is repeated for every instruction in the series of original instructions 20 that must be translated. In the initial step 30 an initial set of paths is generated, which contains one empty path and the set of live operands is initialized to an empty set. An instruction count is set to zero. After the initial step a first step 31 is executed.

In first step 31 the instruction count i is incremented and a new set of paths {P(i)} is generated by appending all possible processors "x" to all predecessor paths from the previous set of paths {P(i−1)}, to execute the instruction indicated by the instruction count i. In a second step 32, the aggregate cost A of each path P(i) is determined, by adding the implementing costs for the instruction i on the processor x for the relevant path and the transfer costs for operands of that instruction that are not available on the processor after the predecessor path. In a third step 33, the set of live operands is updated, by adding results produced by instruction i that will be used by later instructions and removing operands of instruction i that are not used by later instructions. In a fourth step 34 the upper bound transfer costs U for the live operands are determined for each path (e.g. transfer costs to a favored processor 12). In a fifth step the minimum of A+U is determined among the paths. In a sixth step 36 those paths are removed from the set of paths that are have higher costs than the minimum MIN (e.g. where the aggregate costs of the path A minus the headstart costs are higher than the minimum MIN). In a seventh step 37 it is tested whether any instructions from the series of original instructions 20 remain to be implemented. If so the process is repeated from first step 31. If not, an eight step 38 is executed in which the path with minimum aggregate costs is selected and used to control the subdivision into sections 22a-c, 24a,b.

Subsequently, instructions are generated that implement the instructions from the series 20 in the respective processors selected in the selected path. In addition the required transfer instructions are generated, transferring e.g. data from a register in a register file 122, 162 in a processor 12, 16 to data memory 18 and from data memory 18 to the register file 122, 162 in another processor 12, 16. In principle the transfer instructions may be located anywhere between the instruction that produces the operands involved and instructions that use the operands.

It will be appreciated that the flow chart of FIG. 3, although it provides an advantageous embodiment, is but one example of a process for selecting the subdivision into sections. Many alternatives are possible, which implement the search for the boundaries between sections in a different way while still resulting in a lowest cost subdivision into sections, or which use some approximation that may result in a near optimal subdivision with less work to search for a subdivision.

For example, it may be possible to reject some newly generated paths immediately by comparing different paths generated from the same predecessor paths. I.e. one may make a limited comparison between a number of different implementations that use the same processors for all instructions except a last instruction i of a partial path P(i). In this case it is not necessary to consider implementing the instruction i on a processor where its operands are not available, if the cost of implementing the instruction i on that processor is no greater than on other processors and the cost of transferring the results of the implemented instruction is no greater than the cost of transferring its operands to another processor. This limited comparison may be used to reduce the number of paths that need to be considered.

As another example, one may make use of the fact that many operands are either used within a few instructions after they have been produced or throughout the program. As a result of this, the "memory" of the aggregate cost A is relatively short: the aggregate costs of paths that are the same in the selection of the processor for the last few instructions up to instruction i generally increase by the same amount (i.e. independent of the differences for earlier instructions). This can be used to compare a subset of paths that are the same for a predetermined number of instructions up to instruction i and to retain only that one of the subset which has the lowest aggregate costs.

When a favored processor 12 on average has lower costs for implementing the instructions the optimal subdivision of series 20 into sections will tend to assign most instructions to the favored processor, with small islands of differently assigned instructions around instructions that can be implemented with lower cost on another processor 16.

FIG. 4 shows a flow chart of a process that makes use of this. In a first step 41 it is determined whether an instruction i from series 20, 12 is an instruction that can be implemented at lower cost at a non-favored processor 16. If not, a second step 42 is executed increasing the instruction count and recording where the result of implementing instruction i and/or any transferred operands are available. Second step 42 is followed by a third step 43 for testing whether all instructions have been processed. If not the process is repeated from first step 41.

When first step 41 determines that instruction i from series 20 12 is an instruction that can be implemented at lower cost at a non-favored processor 16, a fourth step 44 is executed. If fourth step 44 determines that the implementation cost of the instruction on the non-favored processor plus the cost of any transfer instructions to transfer operands and result from and to the favored processor 12 is less than implementation cost on the favored processor 12 processor a fifth step 45 is executed, assigning the instruction i is to the non-favored processor 16, followed by second step 42. Otherwise, a sixth step 46 is executed, setting up a list of instructions that initially contains instruction i, and an auxiliary instruction pointer j which is initialized to i.

In a seventh step 47 the instructions within a predetermined distance (e.g. only the next instruction j+1, or within two instructions j+1, j+2) from instruction j are searched for a next instruction that can be implemented at lower cost at the same non-favored processor 16 as instruction i. If none is found the second step 42 is executed. If such an instruction is found an eight step 48 is executed in which the instruction that has been found is added to the list and j is set to the count of the instruction that has been found. It is tested whether the implementation cost of the instructions in the list of instruction together on the non-favored processor plus the cost of any necessary transfer instructions to transfer operands and result from and to the favored processor 12 is less than implementation cost on the favored processor 12 processor. If so fifth step 45 is executed and the instruction count is appropriately incremented. If not the process is repeated from seventh step 47.

Again it should be appreciated that the flow chart of FIGS. 3 and 4, although providing advantageous embodiments, are only example of processes for selecting the subdivision into sections 22a-c, 24a,b. Many alternatives are possible e.g. alternative processes might search backwards through the instructions of series 20, with properly modified computations of transfer costs, or instead of executing the whole process instruction for instruction one or more of the steps may be executed for all instructions first.

Although the invention so far has been described under the assumption that each instruction from the series of input original instructions 20 is implemented as one or more instructions on a processor 12, 16, it will be appreciated that under some circumstances a plurality of instructions from series 20 may be implemented as a single instruction on one of the processors, e.g. on a VLIW processor 16. Obviously, such an implementation significantly reduces cost when execution time is weighed in the cost.

The process for selecting sections 22a-c, 24a,b must be slightly modified in this case. The plurality of instructions in series 20 that is involved may for example be replaced in the series 20 by a virtual VLIW instruction made up of the instructions from this plurality, so that implementation on a non VLIW processor will be treated as an implementation that implements this virtual VLIW instruction by means of a number of successive instructions that are implementations of the original instructions from the series. Of course, it is also possible to search for different combinations of instructions that may be combined into such virtual VLIW instructions.

Of course, the selection of instructions from series 20 for combination into a virtual VLIW may also be combined with the search for boundaries between sections 22a-c, 24a,b. This can be done for example by generating different paths P(i) wherein selected groups of instructions from series 20 are combined into VLIW instructions. In this case the computation of aggregate cost generally involves no additional cost for those instructions that are added to a first instruction in the VLIW instruction (or it involves any suitably modified cost computation, which expresses cost of executing additional instructions in a VLIW instruction).

In the preceding it has been assumed that the instructions from series 20 are implemented sequentially on processors 12, 16, that is that successive instructions will be implemented successively even if they are implemented on different processors. Of course, this is not necessary if data dependencies permit parallel execution. This too may be accounted for during the search, for example by counting no additional execution time cost for an instruction in a path P(i) if the instruction may be executed in parallel with a preceding instruction in the path that runs on a different processor.

Similarly, if data dependencies permit, instructions in series 12 may be rearranged. This may permit a lower execution cost, for example when instructions that can be executed at less cost on a non-favored processor 16 are clustered in this way, so as to form a section, or even one or more successive VLIW instructions that each implement more than one instruction from series 20. At the least clustering of instructions with heavy data dependence can make the search for section boundaries more efficient.

Although the search process has been described using individual instructions i, it should be understood that larger units of instructions may be used. For example, it has been found that instructions are preferably assigned to different processors in basic blocks (a basic block is a sub-series of series 20 that starts with a branch target and ends just before a next branch instruction). It has been found that a near optimal cost can be realized by assigning the instructions of basic blocks as a whole to the same processor. This can be used to make the search for section boundaries more efficient by making paths for basic blocks instead of individual instructions.

In the preceding it has been assumed that no other instructions than those implementing series 20 need to be run. However, without deviating from the invention instructions from one or more other tasks may be preassigned to the processors. If this assignment leaves processors 12, 16 free to execute additional instructions in some instruction cycles, the series 20 may be implemented with instructions in cycles where a processor 12, 16 is still free. A search for such an implementation may be implemented for example by assigning a prohibitively high cost to instruction execution by a processor 12, 16 in cycles where the processor 12, 16 already has an assigned instruction. In this case it may occur that a cost effective processor for implementing an instruction is not free in a particular cycle when that instruction can be scheduled. As a result, it may be more cost effective to implement the instruction in a less suitable processor. However, it may also be more cost effective to idle until the most cost effective processor is free. This would cause the other processors to idle (executing for example NOP instructions). Therefore, in this search additional idle instructions may be inserted in the implementation of the series of original instructions 20 in order to wait for availability of a cost effective processor. Such idles may be accounted for by including paths P(i) with such idles inserted in the search process.

In this way, JAVA programs received via the internet may be implemented as native instructions for processors 12, 16 that are executed interleaved with fixed tasks executed by those processors in available cycles. This has the advantage that no special processor is needed to execute such a JAVA program. This is especially advantageous in equipment with embedded processors, such as television sets, mobile phones, household equipment or personal care equipment which can thus efficiently execute JAVA programs.

The invention claimed is

1. A method of distributing a series of instructions executed by an interpreter program on a single processor to a plurality of processors, the method executed by a processor comprising acts of:
    splitting the series of instructions into sections having a plurality of alternative boundaries;
    assigning the sections to respective processors having a native instruction set with a better execution cost factor for execution of the series of instructions of the assigned section than that of the interpreter program to reduce the execution cost when native instructions are used;
    translating instructions from each of the sections into native instructions for the respective processors; and
    appending operand transfer instructions to the sections to support data dependencies between the sections,
    wherein a boundary between the assigned sections is selected from among the plurality of alternative boundaries so as to reduce an aggregate of execution cost factors of the instructions as implemented and including costs for the operand transfer instructions.

2. The method according to claim 1, wherein the execution cost factor for the instructions of the section for a particular processor of the processors increases with a duration needed for executing native instructions used to implement the section on the particular processor.

3. The method according to claim 1, wherein the execution cost factor for the instructions of the section for a particular processor of the processors increases with an amount of energy consumed by the particular processor for executing native instructions needed to implement the section in the particular processor.

4. The method according to claim 1, wherein the act of selecting of the location of the boundary comprises acts of searching by stepping through groups of one or more instructions and evaluating and comparing aggregate cost factors including costs for operand transfer instructions for implementing the groups for each of the processors.

5. The method according to claim 4, wherein the groups are basic blocks of instructions in the series of instructions.

6. The method according to claim 1, wherein the instructions are JAVA byte codes.

7. The method according to claim 1, comprising an act of executing the sections using the instructions native to the processors.

8. The method according to claim 1, wherein one of the processors is a VLIW processor capable of implementing a plurality of instructions per native instruction, the cost factor for implementing instructions on the first one of the processors decreasing as more instructions are combined into the same native instruction, the method comprising an act of combining a plurality of instructions from the sections assigned to the VLIW processor into a VLIW native instructions.

9. The method according to claim 8, wherein one of the processors is a second processor capable of implementing at most one instruction per native instruction, and wherein an execution cost factor for the respective instructions is used for the at least one of the second processors which is less than for the VLIW processors per implementing instruction used in the VLIW or the second processor.

10. The method according to claim 1, wherein the act of selecting the location of the boundary comprises acts of:
    cumulatively constructing a plurality of unique assignment paths, wherein the respective instructions up to a particular instruction are assigned to be implemented on the respective processors;
    comparing aggregate costs for a first one of the paths with aggregate costs for a second one of the paths plus costs for making needed operands after the second path available at least in the same way as after the first path;
    eliminating the first path from consideration when the aggregate costs of the second path are below the aggregate costs of the first path.

11. The method according to claim 10, wherein the aggregate costs for the first and second paths are compared by computing costs of making the needed operands available on a favored one of the processors after a second path of the two paths and costs of making a set of the needed operands, which are available on processors other than the favored one of the processors after a first path of the two paths, available on the processors other than the favored one of the processors after the second path.

12. The method according to claim 1, wherein the acts of the method are performed by a computer programmed.

13. The method of claim 1, wherein alternative boundary locations correspond to a plurality of alternative paths of instructions to the processors, and the execution cost factors comprise the costs of following each alternative path.

14. The method of claim 13, wherein potential alternative paths are eliminated if the cost of following the alternative path is greater than a threshold value determined from the costs of following each of the alternative paths and an upper bound on associated costs for operand transfer instructions.

15. The method of claim 14, wherein the upper bound for each alternative path is based on a cost for transferring all operands from the alternative path to a preferred processor.

16. The method of claim 1, wherein one of the processors is defined as a preferred processor, and each instruction of the series of instructions are provided to the preferred processor unless a cost of implementing the instruction on an other processor is less than a sum of implementing the one or more instructions on the preferred processor, and either one of: the cost of implementing the instruction or the cost of implementing the instruction and one or more subsequent instructions on the other processor, plus the cost of any transfers, is smaller than the cost of implementing the instruction or the instruction and one or more subsequent instructions, respectively, on the preferred processor.

17. A non-transitory computer readable storage medium that includes a computer program for performing a method of distributing a series of instructions executed by an interpreter program on a single processor to a plurality of processors, the method comprising acts of:

splitting the series of instructions into sections having a plurality of alternative boundaries;

assigning the sections to respective processors having a native instruction set with a better execution cost factor for execution of the series of instructions of the assigned section than that of the interpreter program to reduce the execution cost when native instructions are used;

translating the instructions from each of the sections into native instructions for the respective processors; and appending operand transfer instructions to the sections to support data dependencies between the sections, wherein a boundary between the assigned sections is selected from among the plurality of alternative boundaries so as to reduce an aggregate of execution cost factors of the instructions as implemented and including costs for the operand transfer instructions.

18. A data processing apparatus comprising:

a processor configured to distribute a series of instructions for execution by an interpreter program on a single processor to a plurality of processors;

a translation device arranged to:

split the series of instructions into sections having a plurality of alternative boundaries;

assign the sections to respective processors having a native instruction set with a better execution cost factor for execution of the series of instructions of the assigned section than that of the interpreter program to reduce the execution cost when native instructions are used;

translate instructions from each of the sections into native instructions for the respective processors; and append operand transfer instructions to the sections to support data dependencies between the sections, wherein a boundary between the assigned sections is selected from among the plurality of alternative boundaries so as to reduce an aggregate of execution cost factors of the instructions as implemented, including costs for the operand transfer instructions.

19. The data processing apparatus according to claim 18, wherein the translation device is one of the processors, which is programmed to generate the native instructions to implement the instructions of the sections.

20. The data processing apparatus according to claim 18, wherein the selection of the location of the boundary comprises searching by stepping through groups of one or more instructions and evaluating and comparing aggregate cost factors including costs for operand transfer instructions for implementing the groups for each of the processors.

* * * * *